Nov. 8, 1966 L. E. FORMAN ETAL 3,284,430
BATCH PROCESS FOR THE POLYMERIZATION OF DIOLEFINS WHEREIN
A PORTION OF THE REACTION MEDIA IS CARRIED OVER
TO THE NEXT BATCH
Filed Oct. 16, 1961
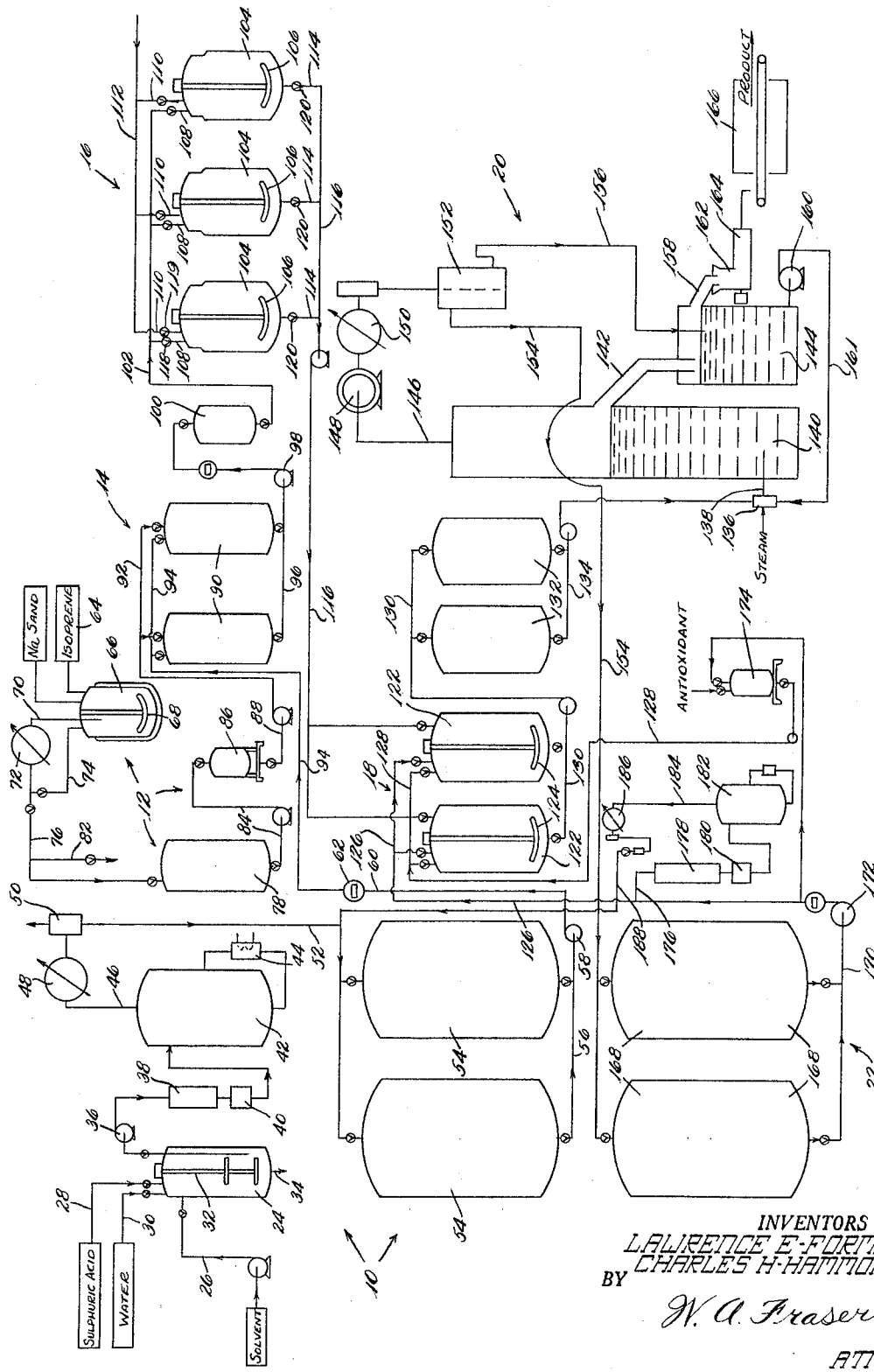
INVENTORS
LAWRENCE E. FORMAN
CHARLES H. HAMMOND
BY
W. A. Fraser
ATTY.

3,284,430
BATCH PROCESS FOR THE POLYMERIZATION OF DIOLEFINS WHEREIN A PORTION OF THE REACTION MEDIA IS CARRIED OVER TO THE NEXT BATCH
Lawrence E. Forman and Charles H. Hammond, Akron, Ohio, assignors to The Firestone Tire & Rubber Company, Akron, Ohio, a corporation of Ohio
Filed Oct. 16, 1961, Ser. No. 146,081
6 Claims. (Cl. 260—94.2)

This application is a continuation-in-part of application No. 650,774, filed April 4, 1957 and now abandoned.

This invention relates to a process and apparatus for the continuous, or effectively continuous, polymerization of diolefines and mixtures thereof with other unsaturated compounds, and more particularly to a process and apparatus of this type adapted for use with certain novel catalysts more particularly described hereinbelow.

It has been discovered, in investigations in which the present applicants have been associated, that diolefines, and particularly isoprene, when carefully purified and contacted with certain catalysts involving lithium and other highly reducing metals, will form polymers which closely approach, in properties and ultimate chemical structure, Hevea natural rubber. These newly developed catalysts present certain special difficulties in commercial operation. Polymerization processes involving these catalysts are most conveniently carried out in solution in solvents, and since the polymers are of high molecular weight the solutions become quite viscous during the process. This leads to "channelling," i.e., a state of operation in which that portion of the material which has polymerized earliest tends to stagnate in the apparatus, forcing the portion of the material which has not yet polymerized to by-pass and escape polymerization. Some of the most satisfactory of the catalysts used are solids, which tend to become segregated, after becoming entrapped in the stagnant earlier polymerized material, thus compounding the difficulty, since the stagnant material is already well ahead in the polymerization and needs no catalyst, and on the other hand, the less completely polymerized material which channels its way through the equipment and stands in greatest need of catalyst, is actually deprived of catalyst and given less residence time in which to react.

Commercially, it is desirable to operate in a substantially continuous, reproducible manner, and the above difficulties militate against the achievement of this purpose.

Accordingly, it is an object of this invention to provide a novel and superior process and apparatus for the polymerization of dienes, using the novel catalysts above referred to.

Another object is to provide such a process which may be carried out in an effectively continuous manner.

Another object is to provide such a process which will avoid stagnation of any portion of the polymerization mass.

A further object is to provide such a process which will maintain the catalyst uniformly distributed throughout the reaction mass.

A still further object is to provide such a process which may be carried out in inexpensive and readily available equipment, with a minimum of technical supervision.

The invention will be described in connection with the accompanying drawing, which is a flow sheet illustrating the process of this invention.

SYNOPSIS OF THE INVENTION

The objects above referred to are secured, in accordance with this invention, in a process in which a solution of a conjugated diolefine (or mixture thereof with one or more other monomers copolymerizable therewith) together with one or more of the reducing-metal-based catalysts above referred to, is charged into a primary reaction vessel. The charge is agitated in the primary reaction vessel at a temperature such as to induce polymerization, and when the polymerization has been completed or has proceeded to a predetermined extent, the charge is forwarded to a secondary holding vessel. In this secondary vessel the polymerization, if it has not proceeded to completion, is carried on further, and any other desired operations such as dilution for recovery, etc. are performed. This relegation of secondary operations to the secondary vessel greatly reduces the space requirements of the primary reactors, and also makes possible various other economies detailed hereinbelow. Agitation is carried out in both the primary reaction vessel and in the second holding vessel, so that the contents are kept homogeneous and channelling is prevented. The flow of the charge through the apparatus may shade from, on the one hand, semi-cyclic, when discrete successive batches of monomer, solvent and catalyst are charged into the primary reaction vessel, agitated therein while maintaining closed the connection between the primary reaction vessel and the holding vessel until the polymerization has proceeded to the desired extent, and then transferred to the holding vessel, and on the other hand, continuous, in which the monomer or on the other hand, continuous, in which the monomer, solvent and catalyst are continuously supplied to the primary reaction vessel, and a corresponding more or less polymerized material is bled off to the holding vessel. In intermediate modes of operation that the primary reaction vessel is partly filled with reaction mixture, but that a certain amount of space is available, a fresh charge of monomer is added and permitted to mingle with the charge and to polymerize for a period, and the charge to the holding vessel, until which a portion of the material in the primary is transferred to the holding vessel, making again a certain amount of usable free space, replenished with monomer and solvent. The cycle being repeated indefinitely. The charge of the reaction vessel upon each such cycle being adjusted over quite a wide range. For one extreme, 3% of the charge will be discharged and 97% retained on each cycle; at the other extreme, 97% of the charge will be discharged and 3% will be retained on each cycle. The percentages cited are on charge. The percentages cited are only tents of the reactor immediately before cycle. When the contents of the reactor are the cycles are frequent and the amount transferred are small, the operation approaches continuous operation; when the intervals between charge transfers are greater, the operation takes on a cyclic character. In either case, a cyclic character of polymer solution of a tinuous flow of polymer solution is provided, rality of primary reaction vessels may be connected in parallel, and the outlets of these may be connected to discharge into one or two holding vessels connected with cycles of the primary vessels nearly perfectly to provide a more nearly perfect polymerized material to the holding vessels, conducted in this manner avoiding stratification of polymerized material, and stratification of the polymerized material.

It will be seen that the above certain amount of "hold-over" for a certain amount of freshly-charged material with freshly-charged for a smoother induction -ly charged material, thus matching the behavior of tube-type reactors in this respect. On the other hand, the restricted outflow of material, which will generally be through a relatively narrow conduit, which may be throttled down or completely closed by a valve during the non-discharging phases of the cycle, prevents any possibility of fresh material channelling directly through the equipment with inadequate residence time therein. The products exhibit to the optimum degree the properties obtainable with the novel reducing-metal-based catalysts.

The diolefins employed

Diolefins suitable for use in this invention include (the preferred) isoprene, butadiene, 2-methyl-1,3-pentadiene, piperylene, 2-t-butyl butadiene, 2-ethyl butadiene, 2-isopropyl butadiene, 2-isobutyl butadiene, and other conjugated diolefins containing up to ten carbon atoms. It will be understood that mixtures of diolefins indicated as being satisfactory may also be used.

The diolefins employed in this invention should preferably be of a high degree of purity for use in the practice of this invention. By high purity is meant that the diolefin should be of at least more than 90 mol percent purity and preferably in the neighborhood of 95 or more percent purity. It will be understood that inert hydrocarbons such as the solvents used in the polymerization or non-reactive olefins are not to be considered as impurities in calculating the degree of purity of the diolefin.

Reactive hydrocarbon impurities such as acetylenic compounds containing hydrogen on a triply-bonded atom are acidic in character and react directly destroy the catalyst with production of acetylides; compounds should be kept to a minimum.

Other unsaturated compounds, such as acetylenic compounds containing no hydrogen on the double bond; non-conjugated olefins do not so actively harm it; but they do use up a certain amount of catalyst. Some of them tend to polymerize or copolymerize to extent spoil the microstructure of the polymer or the molecular weight thereof. It is therefore recommended, but not absolutely prohibited, that compounds be removed as far as possible. In general the closer the conjugated diolefin, the faster the polymer and the closer the structure and properties of the product to natural rubber. Any inhibitor present in a commercial diolefin must be removed by conventional techniques prior to polymerization to use with the invention.

Monomers in accordance with the invention are Pure Grade 1 or Research Grade 2 isoprene. No further purification required of these monomers prior to use with the inhibitor therefrom. Desirable polymers of the invention are also produced of isoprene[3] which has a purity of contains minor amounts of alkyl containing other unsaturates, provided the unsaturates are reduced by well-known chemical methods to produce a monomer having an index of refraction at 20° $n_D^{20}=1.4210$ to 1.4216. A final found particularly suitable containing sodium or other alkali distilling the isoprene away from polymerization run described below, standard of purity was used.

[1] ... Petroleum Company, Bartlesville, ... having a purity of 99 mol percent ... 0° C. of $n_D^{20}=1.422$.
[2] ... Company and represented percent and a refractive index ...
nc.

Concentration of moisture, air, oxygen, etc.

Moisture in the polymerization zone, since it tends to use up catalyst, should be kept at a minimum. Oxygen and other components of the atmosphere have been found to inhibit polymerization and consequently should be nearly as possible be kept out of the reaction zone. To this end it is desirable that the diolefins be handled at all times in contact only with their own vapors or with atmospheres containing only their own vapors and inert gases such as helium or argon. The undesired gaseous materials are conveniently removed by bringing the polymerization charge to a boil and venting a portion (e.g. about 10%) of the charge prior to sealing the same and effecting polymerization. Particularly to be avoided is the presence of oxygenated and nitrogenous organic compounds such as ethers, esters, amines and the like, which are sometimes considered to be indispensable contituents of alkali-metal-based catalyst systems; these compounds should be rigorously excluded from the reaction mixtures of this invention. It will be understood that all of the components entering the reaction chamber—monomeric isoprene, catalyst, solvents, equipment components, etc.—should be free from the deleterious materials discussed in the present paragraph and in the preceding section entitlted "The Diolefins Employed" so as not to render useless the precautions for purity recommended.

Temperature

It has been found that the molecular weight and proportion of cis-1,4-structure of the polymers in accordance with the invention generally increase as the temperature of polymerization is decreased. Additionally, the reaction is quite difficult to control at elevated temperatures, particularly where diolefins of the preferred highest purity are employed. It has been found that the gel content of the polymer increases as the polymerization temperature increases especially when lithium-dependent catalysts are employed. Consequently, it is desirable to operate at the lowest temperature at which a practical yield of the desired product can be obtained. A polymerization temperature of from 40° C. to 80° C. is preferred.

Solvent systems

Any solvent to be used in the process of this invention must be a non-polar, non-acidic organic solvent, preferably a hydrocarbon solvent containing from 3 to 50 carbon atoms and still more preferably, 3 to 16 carbon atoms. Suitable solvents include the saturated aliphatic hydrocarbon solvents such as straight and branched-chain paraffins and cyclo-paraffins containing from 3 to 50 carbon atoms, such as propane, pentane, hexane, heptane, dodecane, petroleum ether, cyclopentane, cyclohexane, methyl cyclohexane heneicosane, kerosene, mineral oil and the like. Aromatic solvents such as benzene toluene, the several xylenes and the like are also operable. The same considerations as to purity and absence of interfering compounds apply to the solvent as to the monomeric diolefin. A treatment which has been found particularly advantageous for the purification of paraffin solvents such as petroleum ether consists in agitating them with concentrated sulfuric acid, and thereafter repeatedly washing them with water. The solvents may then be dehydrated by passage through a silica gel, alumina, calcium chloride or other dehydrating and adsorbing agent, and thereafter distilling. Similarly as in the case of the isoprene or other diolefin, the solvent after purification should be handled in contact only with its own vapor or with atmospheres containing only its vapor and inert gases such as helium or argon.

Comonomers

As noted above, in addition to being polymerized alone, the diolefins may also be copolymerized with other unsaturated compounds. In general, it is preferred that the copolymerized compounds should constitute not over 25%, based on the total weight of the diolefin plus the co-polymerized compounds, as such polymers approach closest to the properties of Hevea rubber. However, in any copolymers produced by the process of this invention and containing a significant amount, say 10% or more, of a diolefine, the diolefine-derived portion of the polymer chain will possess a microstructure comparable to that of Hevea rubber, and will exhibit properties distinguishing it from comparable conventionally produced polymers. Compounds suitable for co-polymerization with diolefins in the practice of this invention include polymerizable ethylenically unsaturated compounds such as styrene alpha-methyl styrene, and the like. The comonomers should be free of ether, nitrile, nitro and other highly negative groups. It will be understood, of course, that the same rigid standards for purity should be maintained for the comonomers as for the diolefin and solvent.

*The catalysts*

The catalysts employed in this invention are those which are capable of directing the polymerization of conjugated diolefins into desirable configurations, vis., 1,4-addition and particularly cis-1,4-addition. Hereinafter such catalysts will be designated as "stereodirective" catalysts. These are based upon the highly reducing metals of Groups I–III of the Periodic table, or highly reducing compounds based on such metals, usually complexed with a compound of some more easily reduced heavy metal. Lithium is unique amongst the highly reducing metal components, since it *need not* be complexed with any compound of a heavy metal, in order to direct the polymerization toward the formation of 1–4, and specifically cis-1,4 configurations, but may be supplied as the free metal, or in the form of a compound in which the lithium is in unoxidized state, such as organolithium compounds including lithium hydrocarbons. Suitable lithium hydrocarbons are those containing up to 40 carbon atoms, for instance alkyl lithium compounds such as methyl lithium, ethyl lithium, butyl lithium, amyl lithium, hexyl lithium, 2-ethyl-hexyl lithium and n-hexadecyl lithium. In addition to the saturated aliphatic lithium compounds, unsaturated compounds are also suitable such as allyl lithium, methallyl lithium and the like. Aryl, alkaryl and aralkyl lithium compounds such as phenyl lithium, the several tolyl and xylyl lithium, alpha- and beta-naphthyl lithium and the like are also suitable.

Mixtures of the various hydrocarbon lithium compounds are also suitable. For instance, catalyst can be prepared by reacting an initial hydrocarbon lithium compound successively with an alcohol and with an olefine such as isopropylene (i.e. a technique analogous to the "Alfin" technique) whereby a greater or lesser proportion of the lithium from the initial hydro-carbon goes to form a lithium alkoxide and to form a new organolithium compound with the olefin.

Additional hydrocarbon lithium compounds are the hydrocarbon polylithium compounds such as for instance any hydrocarbon containing from 1 to about 40 carbon atoms in which lithium has replaced a plurality of hydrogen atoms. Illustrations of suitable hydrocarbon polylithium compounds are alkylene dilithium compounds such as methylene dilithium, ethylene dilithium, trimethylene dilithium, tetramethylene dilithium, pentamethylene dilithium, hexamethylene dilithium, decamethylene dilithium, octadecamethylene dilithium and 1,2-dilithium propane. Other suitable polylithium hydrocarbons are polylithium aryl, aralkyl and alkaryl compounds such as 1,4-dilithium benzene, 1,5-dilithium naphthalene, 1,2-dilithium-1,3-triphenyl propane, the compound of the formula

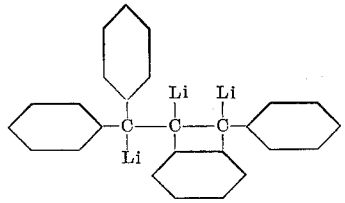

and the like. Tri- and higher lithium hydrocarbons are also suitable, such as 1,3,5-trilithium pentane or 1,3,5-trilithium benzene. Other organolithium compounds include the various lithium hydrocarbon amides.

As noted above, lithium may be, and all of the other reducing metals of Groups I–III must be, associated with a complex involving a more readily reducible heavy metal or similar element in order to direct the polymerization to the formation of desired configurations. The complexes are in general salts whose anions are composed of heavy metals, boron, silicon or arsenic covalently linked to one or more negative groups so as to impart a negative charge to the group as a whole. In addition to the negative groups, the heavy metal, boron, silicon or arsenic may also have covalently linked thereto relatively neutral groups such as alkyl, aryl or other hydrocarbon groups, carbonyl groups, hydrate ($H_2O$) groups or the like.

By the term "heavy metal" is understood all those elements enclosed by the bracket entitled "Heavy Metals" and by the heavy black lines terminating at said bracket (including the lanthanides) in the periodic chart given at Langes' "Handbook of Chemistry," fifth edition, Handbook Publishers, Inc., 1944, pages 54 and 55. These complex salts may in general be represented by the formula (I) $\qquad (M_{EP})_n[(M_H)_oX_pA_q]_r$ wherein $M_{EP}$ is an electropositive metal cation of Groups I–III of the periodic table
$M_H$ is a heavy metal, boron, silicon or arsenic
$X$ is an electronegative radical covalently linked to $M_H$
$A$ is a neutral radical covalently linked to $M_H$
$n$, $o$, $p$, $q$ and $r$ are integers, with the proviso that $q$ may be zero In general, although not necessarily, the maximum covalency, most commonly 6, will be elicited from the heavy metal $M_H$, so that if $V_H$=covalency maximum of $M_H$
$V_X$=covalency of X
$V_A$=covalency of A then $$oV_H = pV_X + qV_A$$

Also if $E_E$=positive electrovalence of $M_{EP}$
$E_E$=positive electrovalence of $M_H$
$E_X$=negative electrovalence of X then $$nE_E = r(pE_X - oE_H)$$

Suitable elements which may be presented by $M_{EP}$ include any of the metals and particularly the strongly electropositive metals such as lithium, sodium, potassium, rubidium, cesium, calcium, magnesium, and the like. Suitable elements which may be represented by $M_H$ include as aforesaid the heavy metal elements, boron, silicon and arsenic, typical examples of these being aluminum, titanium, mercury, vanadium, manganese, molybdenum, chromium, cobalt, iron, zinc, platinum, nickel and the like. Suitable negative groups represented by the radical X are exemplified in fluorine, chlorine, bromine, iodine, oxygen and hydroxyl groups, and hydrocarbon groups containing up to forty carbon atoms such as methyl, ethyl, propyl, butyl, pentyl, hexyl, phenyl and like groups. Suitable neutral groups represented by the radical A are exemplified in the carbonyl (CO) group, the hydrate group and the like. It will be understood that when the subscripts $n$, $o$, $p$, $q$ and $r$ are greater than one, the radicals to which they are appended need not be pure radicals, but may be mixtures of radicals individually qualified for the positions they occupy. An extensive discussion of complexes is given in Ephraim "Inorganic Chemistry" sixth edition, Interscience Publishers Inc., 1954, chapters 10, 11 and 12. Typical complex anions are those of the formulae

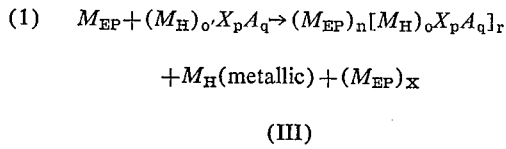

| | |
|---|---|
| $[AlCl_6]^{---}$ | $[AlCl_4(H_2O)_2]^-$ |
| $[AlI_6]^{---}$ | $[Ti^{III}Cl_5(C_2H_5)]^{---}$ |
| $[ZnBr_4]^-$ | $[BF_4]^-$ |
| $[PdCl_6]^{--}$ | $[FeO_3]^{---}$ |
| $[UO_2Br_4]^{--}$ | $[AlBr_6]^{---}$ |
| $[ClCl_5(H_2O)]^{--}$ | $[Al(CH_3)Cl_5]^{---}$ |
| $[TiCl_5(C_5H_{11})]^{--}$ | $[PtCl_6]^{--}$ |
| $[SiF_6]^{--}$ | $[SbCl_6]^{---}$ |
| $[AlO_3]^{---}$ | $[TiF_6]^{--}$ |
| $[AlF_6]^{---}$ | $[TiCl_6]^{--}$ |
| $[AlOCl_4]^{---}$ | $[PtCl_6]^{--}$ |
| $[ZnBr_5]^{---}$ | $[ZnF_6]^{----}$ |
| $[SiF_6]^{--}$ | $[Ti^{III}Cl_6]^{---}$ |
| $[Mo^VOF_5]^{---}$ | |

Particularly good results are obtained with complex salts formed in situ in contact with the Group I–III reducing metal (or reducing compound thereof) by reaction of the Group I–III material upon a suitable heavy metal compound, with reduction of the heavy metal. Reactions of this type may be represented as follows.

(1)  $M_{EP}+(M_H)_{o'}X_pA_q \rightarrow (M_{EP})_n[M_H]_oX_pA_q]_r$ $+M_H(\text{metallic})+(M_{EP})_x$ (III)

The equation is not balanced, as the coefficients would unduly complicate the equation. The notation is that of Formula I above, with the addition of $o'$ which is an integer which may be different from $o$ to allow for changes in valency of $M_H$ and structure of the compounds in the course of reaction. In some cases the heavy metal is not reduced to the metallic state (III), in which case this term will not appear in the equation. Usually the highly reducing material will be employed in excess, the unreacted position serving to act as the initiator of polymerization.

It will also be undersood that the metal $M_{EP}$ in Equation 1 above need not be in the form of free metal, but may be contained in a compound in which the metal exerts its strong reducing character, e.g. organometallic compounds such as metal alkyls, metal aryls and other metal hydrocarbons containing up to 40 carbon atoms, metal hydrides, Grignard reagents and the like. Following are lists of the highly reducing metals and compounds of groups I–III and of heavy metal compounds which may be complexed therewith for use in the process of this invention.

TABLE I.—HIGHLY REDUCING METALS AND COMPOUNDS OF GROUPS I–III

| | |
|---|---|
| Lithium metal | Aluminum triethyl |
| Sodium metal | Aluminum metal |
| Potassium metal | Boron triethyl |
| Cesium metal | Lithium aluminum hydride |
| Amyl lithium | Lithium borohydride |
| Pentamethylene dilithium | Sodium borohydride |
| Phenyl lithium | Potassium borohydride |
| Amyl sodium | Calcium hydride |
| Hexamethylene disodium | Lithium hydride |
| Amyl cesium | Sodium hydride |
| Lithium hydride | Allylsodium |
| Lithium naphthalenide | Magnesium dimethyl |
| Magnesium metal | Anthracene sodium |
| Ethyl magnesium chloride | Fluorenyl sodium |
| Zinc diethyl | Fluorenyl lithium |
| Diethyl aluminum chloride | |

COMPLEXING COMPOUNDS OF HEAVY METALS

| | |
|---|---|
| Aluminum trichloride | Ferric oxide |
| Titanium tetrachloride | Zirconium tetrachloride |
| Titanium trichloride | Zirconium tetrabromide |
| Boron trichloride | Indium halides |
| Ferric chloride | Gallium halides |
| Titanium tetraiodide | Nickel chloride |
| Cobalt chloride | |

*The apparatus employed in the invention*

Referring now to the drawing, there is shown an apparatus for use in this invention, comprising in general a section 10 for purifying, storing, recovering and supplying solvents; a section 12 for purifying and supplying isoprene or other diene monomer (hereinafter, in the description of the apparatus, the diene to be polymerized will be referred to, for concreteness, as isoprene; however, it will be understood that any of the diolefins or mixtures thereof with other unsaturated compounds described above may be used); a section 14 for receiving solvent and isoprene from sections 10 and 12, and storing same pending use in the process; a bank of primary reactor vessels 16 which receive monomer and solvent from section 14 and initiate polymerization thereof; a bank of secondary holding vessels 18 receiving polymerized solutions from the primary reactor 16; and a polymer recovery system 20 in which the polymer is separated from the solution coming from the secondary holding vessel 18, dried and discharged as product, and from which the solvent is returned to a solvent recovery system 22. Connections (not shown) are provided for flushing the free space in all equipment in the sections 10, 12 and 14, and in the reactor systems 16 and 18 with an inert gas such as argon, helium or the like.

*The solvent supply system 10*

The solvent supply system 10 more particularly comprises a fresh solvent purification vessel 24, having connections 26 for supplying fresh solvent (usually petroleum ether or other like hydrocarbon solvent) and connections 28 and 30 for supplying sulfuric acid and water. The vessel is provided with an agitator 32 and a bottom discharge 34. A pump 36 is arranged to draw the contents from the vessel 24 and to force the same through an alumina drying column 38 and an acidity-neutralizing potassium hydroxide column 40 into a glass-lined still pot 42 provided with a heater 44, offtake 46 and condenser 48, which latter discharges through a separator 50 and line 52 to a bank of purified solvent storage tanks 54. Typical operation of the solvent supply system 10 is as follows. The solvent, usually a high-grade commercial petroleum ether or some other volatile hydrocarbon solvent, is charged into the vessel 24, together with about 10% of its volume of concentrated sulfuric acid. These ingredients are agitated together for one hour. Agitation is then interrupted and the spent sulfuric acid drained off at 34. The solvent is then given three 15 minute washes with deionized water, 4 volumes of water for each volume of solvent being used in each wash. The wash water is drained off at 34 at the conclusion of each wash. The solvent is then pumped out by the pump 36 through the dehydrating and neutralizing column 38 and 40 into the still pot 42, whence it is distilled through the condenser 48 and transmitted through the line 52 to storage tanks 54. From the storage tanks 54 the solvent is taken as needed through the line 56, pump 58, line 60 and meter 62 to the holding system 14 for isoprene-solvent solution.

*The isoprene supplying and purifying system 12*

This system more particularly comprises a source 64 of commercial isoprene, feeding into a still pot 66 provided with an agitator 68, offtake line 70, condenser 72, reflux line 74 and distillate discharge line 76 discharging to a purified isoprene storage vessel 78. The system is operated as follows. The commercial isopene (which is usually about 99.5% purity and will contain a stabilizer e.g., 0.6% of t-butyl catechol) is charged from the source 64 into the still pot 66. A dispersion of sodium sand in petrolatum is added in an amount sufficient to provide about .025 part of sodium per 100 parts isoprene. Agitation is commenced, heat is applied and the mixture is allowed to reflux through the line 74 for 3 hours. The apparatus is then adjusted so as to discharge the condensate through the line 76 into the storage vessel 78, a fore-run of about 0.5% being discharged through a line 82 to waste. From the purified isoprene storage vessel 78, the isoprene is weighed out as needed through the line 84, weigh tank 86 and line 88 to the isoprene-solvent solution holding system 14.

*The isoprene-solvent solution holding system 14*

This system comprises two tanks 90 having connections 92 and 94 respectively from the isoprene and solvent supplying systems 12 and 10. The isoprene solution is drawn as needed from these tanks through a line 96 and forced by a pump 98 through a silica gel drying column 100 and line 102 to the primary polymerization system 16. Isoprene-solvent solutions are made up alternately in the two tanks 90, one being connected on-stream to supply solution to the polymerization system 16 while a fresh solution is being made up in the other. Solution is made up in these tanks by measuring out the desired amount of solvents through the meter 62 in line 94 and weighing out the correct amount of isoprene in the weigh tank 86 and distributing these materials through the line 88 into that one of the two tanks 90 which is off-stream at the time and being used to make up a fresh solution.

*The primary reactor system 16*

This system comprises a bank of autoclaves 104 each provided with an agitator 106 and a connection 108 for receiving isoprene-solvent solution from the supply header 102. Likewise connections 110 are provided from a header 112 for supplying catalysts to the autoclaves 104. The autoclaves 104 are also provided with bottom discharge connections 114 leading to a discharge header 116 through which polymer solution is transmitted from the autoclaves 104 to the secondary holding system 18.

The operation of the primary reactor vessels 104 may be varied from a semi-cyclic flow, to a condition approaching substantially continuous flow operation. In the semi-cyclic mode of operation, isoprene-solvent solution is charged into a vessel 104 through connection 108, agitation commenced and catalyst charged to the line 110. Temperature is adjusted to a value such as to bring about polymerization, whereby the isoprene becomes polymerized to form a solution of polyisoprene in the solvent. When the polymerization has proceeded to the extent to which it is desired to carry the reaction in the primary vessels 104 (this may be substantially complete polymerization, where it is not desired to complete polymerization reaction in the secondary holding system 18; or may be partial polymerization where it is desired to complete the polymerization in the holding system 18). The polymer solution is then drawn off through the connection 114 and header 116 and discharged to the holding system 18. The degree to which the vessel 104 is discharged may be varied. Discharge may be substantially complete, in which case the polymer is taken out to the maximum practical extent that it will drain from the autoclave 104. However, no particular attempt is made in any case to obtain absolutely complete discharge of the vessel. Upon completion of the discharge to the desired extent, fresh monomer-solvent solution is charged through the connection 108, and fresh catalyst is charged through the connection 110, to bring the contents of the vessel 104 up to its original level, and the cycle is repeated. It will be seen that, depending on the degree to which the vessel 104 is discharged in each cycle, the operation thereof varies from quasi-cyclic, in which discharge in each cycle is substantially complete, to substantially continuous when the discharge of each cycle is only a fraction of the content of the vessel 104. In the limit, it is possible to adjust the valves 118 and 119 on the feed connection and 120 on the discharge connection so that a continuous flow of starting material is constantly being introduced into the autoclave 104 and a constant stream of polymerized material is drawn off and discharged through the header 116. In order to smooth out the flow through the discharge line 116, the phases of operation of the several autoclaves 104 may be staggered in time; for instance one reactor will be on the portion of phase in which it is being charged with fresh starting material; one will be on that portion of the phase in which the polymerization reaction is being carried out; while still another is discharging into the line 116.

*The secondary holding system 18*

The system comprises a bank of autoclaves 122, provided with agitators 124 and receiving partially or wholly polymerized solution through the line 116. A line 126 is provided for supplying unpurified recovered solvent from the recovery system 22 to the autoclave 122, and a line 128 is provided for supplying a solution of antioxidant to the autoclave 122. A bottom discharge connection 130 is provided for drawing off the polymer solution from the autoclave 122 and forwarding same to the polymer recovery system 20.

In operation, a more or less continuous flow of polymer solution is received in the tank 122 from the line 116. Additional solvent is supplied through the line 126 and is agitated with the incoming polymer solution to dilute same down to a concentration suitable for handling in the recovery system 20. It will be appreciated that this feature results in a substantial economy in reactor space. The concentration in the reactors 104, which are of relatively expensive construction, will be high, so as to minimize capacity requirements at this point. The hold tanks 122, which may be of cheaper construction, may be made larger to dilute the viscous polymer solution down to concentrations suitable for the polymer recovery system. Also less elaborately purified solvent (e.g., recycle solvent from the unpurified recycle solvent tanks 168 described below) may be used at this point, relieving the load on the purification portion of the solvent recovery system 22. Also, if the polymerization is not complete at the time that the solution is discharged from the reactors 104, the polymerization reaction may proceed to completion in vessel 122. If it is desired that such polymerization shall continue, the antioxidant solution from the line 128 will, of course, not be injected until the polymerization is complete. The holding autoclave 122 may be operated cyclically or continuously. In the case of cyclic operation, one of the vessels will be charged with material coming from the line 116, any polymerization that is desired being allowed to further complete itself and additional solvents and antioxidants introduced through the lines 126 and 128. In the meanwhile, the other of the vessels 122 will be discharging through the header 130 to provide continuity of the supply of polymer solution to the recovery system 20. Alternatively, both tanks may be operated more or less as surge tanks, with more or less continuous discharge of polymer solution through the line 130 and continuous or semi-continuous supply of polymer solution, solvent and antioxidant through the lines 116, 126 and 128.

*The polymer recovery system 20*

This system more particularly comprises a pair of surge tanks 132 for further smoothing the flow of polymer solution coming from the line 130. The surge tanks 132 are provided with a bottom discharge header 134 leading to a mingling connection 136, into which connection steam, hot water, and the polymer solution are simultaneously injected and then discharged through a line 138 into a body of hot water maintained in a tower 140. The tower 140 is provided with an overflow leg 142 discharging to a skimming tank 144, and with an offtake connection 146 leading to a blower 148 and condenser 150. In operation, the polymer solution, steam and hot water are brought together in the mingling connection 136 and ejected into the hot water bath 140. The steam disrupts the polymer solution into droplets and supplies heat to vaporize the solvent, leaving the polymer in the form of fine crumbs. Vaporized solvent bubbles up through the water in tower 140 and is positively drawn out through the line 146 by means of the blower 148 and propelled to the condenser 150 in which it is condensed. The polymer crumbs float upwardly in the column of water to the surface thereof, the water introduced in the connection 136 causes an overflow of water down the leg 142, which flow entrains with it the floating particles of polymer, carrying them down into the skimming tank 144. Referring to the condensed solvent, this is discharged from the condenser 150 to a separator 152 in which the solvent separates from the water and is returned through the line 154 to the solvent recovery system 22. The separated water is returned through a line 156 to the skimming tank 144.

Referring to the skimming tank 144, this comprises an open-topped vessel containing hot water up to slightly below the level of an overflow spout 158. A pump 160 continuously withdraws hot water from the bottom of the vessel 144, discharges same through a line 161 to the blending connection 136, whence it flows, along with the steam and polymer solution, into the tower 140. The overflow from the tower 140 through the leg 142 to the tank 144 completes the circuit of hot water flow. The overflow leg 142 has its bottom opening free of the surface of the water in the skimming vessel 144, so that the polymer crumb may escape and float away upon the surface of the water in the vessel 144. The blower 148 insures that the solvent vapor will be drawn up through the offtake 146 rather than escape from the lower end of the leg 142. In the vessel 144, the slurry of polymer crumb and water discharged from the leg 142 separate out into substantially clear water and polymer crumb, the latter floating to the surface and being raked out over the edge of discharge spout 158 into the hopper 162 of a pelletizer 164 which squeezes out a large portion of the water and discharges the polymer as pellets onto the conveyor of a tunnel dryer 166. The pelletized crumb is dried in the tunnel dryer and discharged at the right-hand end thereof, after which it may be baled or otherwise packaged for shipment.

*The solvent recovery system 22*

This system more particularly comprises a pair of unpurified solvent storage tanks 168 receiving the recovered solvent from the line 154. These tanks are provided with a bottom draw-off line 170 which discharges through a pump 172 to three alternate separate destinations; first through a line 126 to the secondary holding system 18 to dilute the polymer-solvent solution as described above; the solvent for this purpose need not be repurified and accordingly bypasses the purification distillation system 182 described below. Secondly the pump 172 feeds a tank 174 into which antioxidant solution is fed through a line 128 to the secondary holding system 18. Again in this system recovered solvent is used without purification. Thirdly the pump 172 discharges through a line 176 through an alumina drying column 178 and potassium hydroxide column 180 to a still pot 182, whence the solvent is distilled through an offtake 184, condensed in a condenser 186 and transferred through a line 188 to the purified solvent storage tank 54.

A pilot plant in accordance with the figure and designed for a production of 500 pounds per day of dry polymer was operated as follows. The several vessels in the primary reactor system 16 and secondary holding system 18 had the following rated capacities: autoclaves 104, 100 gallons each; autoclaves 122, 150 gallons each.

Each of the autoclaves 104 was operated on an 8-hour cycle, the cycles of the three autoclaves being evenly staggered at intervals of 2⅔ hours. The cycle for each autoclave 104 was as follows: At the start of the cycle, the reactor 104 contained approximately 8 gallons of a preceding batch, comprising a 10% solution of polyisoprene in petroleum ether, together with catalyst residues. Using a density of 0.64 for the petroleum ether and a density of 0.91 for the polyisoprene ("Lange's Handbook of Chemistry" 5th ed., Handbook Publishers Inc. page 47, item under "petroleum ether"; page 649, item under "Natural Rubber" i.e. polyisoprene) the density of the 90% petroleum ether/10% polyisoprene solution will be the weighted average of the two densities or $(90\% \times 0.64) + (10\% \times 0.91) = .667$. The weight of the retained solution carried over from one cycle to the next will thus be 8 gallons $\times 8.34 \times .667 = 44.5$ lbs. The fresh material added at the beginning of each cycle is 60 pounds of isoprene plus 540 pounds of petroleum ether=600 pounds. The total weight of material in process in the fully charged vessel is 600 pounds of fresh material plus the 44.5 pounds of material retained from the previous cycle, or 644.5 pounds. The retained material (44.5 pounds) thus constitutes $$44.5 \div 644.5 \times 100\% = 6.90\%$$

of the contents of the fully charged vessel up to the time just before discharge. The system had been purged with helium, and ingress of air was prevented at all times during the cycle to follow. A charge of 60 pounds of isoprene and 540 pounds of petroleum ether from the purification trains 10, 12 was made up in one of the tanks 90, and charged over the course of one-half hour through the line 96, pump 98, silica column 100, line 102 and line 108 into the reactor 104. Agitation was commenced at the rate of 30 r.p.m. of the agitator 106, the temperature was adjusted to 130° F., and a suspension of a mixture of pentamethylene dilithium and amyl lithium in the weight ratio of 4:1 was injected through the line 112 and connection 110, the total amount of suspension injected containing 0.04 pound of lithium calculated as the metal. Agitation was continued for 6 hours, at the end of which time the polymerization had approached completion. The charge was then transferred through the lines 114, 116 to one of the hold tanks 122, except for approximately 8 gallons of the product retained in the reactor 104 and carried over into the next cycle of that reactor, which was commenced 8 hours after the beginning of the first cycle. This same cycle of operations for the reactor 104 was repeated at 8-hour intervals. Simultaneously, the other two of the reactors were similarly put through repeated 8-hour cycles, but retarded 2⅔ and 5⅓ hours respectively behind the schedule of the first reactor, so as to have the phases of the three reactors evenly spaced apart.

In the hold tank 122, the incoming charge was agitated for two hours to bring about as nearly as possible completion of the polymerization reaction. At that point unpurified petroleum ether from the tanks 168 was run into the hold tanks 122 with continued agitation, to dilute the solution therein down to a concentration of polyisoprene of 6%, based on the weight of solution. As soon as the dilution was completed, the solution was discharged through the line 130 to the surge tanks 132. The surge tanks are discharged at a substantially constant rate through the line 134 to the precipitator section 20, in which the polymerized isoprene is continuously recovered and dried. A composite sample of polyisoprene combined from samples taken at hourly intervals over a 24-hour period of operation had an inherent viscosity of 11.0, and showed an infra-red analysis of 87.9% cis-1,4; 3.7% trans-1,4; 0.0% 1,2-; and 8.3% 3,4-addition of the isoprene, the total unsaturation found by infra-red analysis being 86.3% of the total theoretical unsaturation.

What is claimed is:

1. Process which comprises (I-A) charging a monomeric composition selected from the group consisting of conjugated diolefins containing up to 10 carbon atoms and mixtures thereof with polymerizable ethylenically unsaturated compounds free from highly negative groups, plus an inert organic solvent, plus a stereodirective catalyst into a first primary reactor whereby to cause a solution of a polymer of said monimeric composition to be formed, (II-B) simultaneously with step (I-A), transferring from 3% to 97% of a solution of a polymer of said selected monomeric composition previously formed in a second primary reactor to a holding vessel while retaining, in said second primary reactor, conversely from 97% to 3% of said previously formed solution, the percentages being based on the total charge present in said second primary reactor just before discharge thereof, thereafter (II-A) charging said selected monomeric composition, plus an inert organic solvent, plus a stereodirective catalyst into said second primary reactor whereby to cause a solution of a polymer of said monomeric composition to be firmed, (I-B) simultaneously with step (II-A), transferring from 3% to 97% of the polymer solution previously formed in said first primary reactor to the holding vessel while retaining, in said first primary reactor, conversely 97% to 3% of said previously formed solution, the percentages being based on the total charge present in said first primary reactor just before discharge thereof, and repeating the steps (I-A) and (II-B) on the one hand and (II-A) and (I-B) on the other hand in alternating sequence, whereby to provide a substantially continuous flow of polymer solution to said holding vessel, any step (I-A) being carried out with the first primary reactor still containing the polymer solution retained therein by the immediately preceding step (I-B), and any step (II-A) being carried out with the second primary reactor still containing the polymer solution retained therein by the immediately preceding step (II-B).

2. Process which comprises (I-A) charging isoprene, plus an inert organic solvent, plus a stereodirective catalyst into a first primary reactor whereby to cause a solution of polyisoprene to be formed, (II-B) simultaneously with step (I-A), transferring from 3% to 97% of a polyisoprene solution previously formed in a second primary reactor to a holding vessel while retaining, in said second primary reactor, conversely from 97% to 3% of said previously formed solution, the percentages being based on the total charge present in said second primary reactor just before discharge thereof, thereafter (II-A) charging isoprene, plus an inert organic solvent, plus a stereodirective catalyst into said second primary reactor whereby to cause a solution of polyisoprene to be formed, (I-B) simultaneously with step (II-A), transferring from 3% to 97% of the polyisoprene solution previously formed in said first primary reactor to the holding vessel while retaining, in said first primary reactor, conversely from 97% to 3% of said previously formed solution, the percentages being based on the total charge present in said first primary reactor just before discharge thereof, and repeating the steps (I-A) and (II-B) on the one hand and (II-A) and (I-B) on the other hand in alternating sequence, whereby to provide a substantially continuous flow of polyisoprene solution to said holding vessel, any step (I-A) being carried out with the first primary reactor still containing the polyisoprene solution retained therein by the immediately preceding step (I-B), and any step (II-A) being carried out with the second primary reactor still containing the polyisoprene solution retained therein by the immediately preceding step (II-B).

3. Process which comprises (I-A) charging a monomeric composition selected from the group consisting of conjugated diolefins containing up to 10 carbon atoms and mixtures thereof with polymerizable ethylenically unsaturated compounds free from highly negative groups, plus an inert organic solvent, plus a lithium hydrocarbon catalyst into a first primary reactor whereby to cause a solution of a polymer of said monomeric composition to be formed, (II-B) simultaneously with step (I-A), transferring from 3% to 97% of a solution of a polymer of said selected monomeric composition previously formed in a second primary reactor to a holding vessel while retaining, in said second primary reactor, conversely from 97% to 3% of said previously formed solution, the percentages being based on the total charge present in said second primary reactor just before discharged thereof, thereafter (II-A) charging said selected monomeric composition, plus an inert organic solvent, plus a lithium hydrocarbon catalyst into said second primary reactor whereby to cause a solution of a polymer of said monomeric composition to be formed, (I-B) simultaneously with step (II-A), transferring from 3% to 97% of the polymer solution previously formed in said first primary reactor to the holding vessel while retaining, in said first primary reactor, conversely 97% to 3% of said previously formed solution, the percentages being based on the total charge present in said first primary reactor just before discharge thereof, and repeating the steps (I-A) and (II-B) on the one hand and (II-A) and (I-B) on the other hand in alternating sequence, whereby to provide a substantially continuous flow of polymer solution to the said holding vessel, any step (I-A) being carried out with the first primary reactor still containing the polymer solution retained therein by the immediately preceding step (I-B), and any step (II-A) being carried out with the second primary reactor still containing the polymer solution retained therein by the immediately preceding step (II-B).

4. Process which comprises (I-A) charging a monomeric composition selected from the group consisting of conjugated diolefins containing up to 10 carbon atoms and mixtures thereof with polymerizable ethylenically unsaturated compounds free from highly negative groups, plus an inert organic solvent, plus a lithium hydrocarbon catalyst into a first primary reactor whereby to cause a solution of a polymer of said monomeric composition to be formed, (II-B) simultaneously with step (I-A), transferring from 3% to 97% of a solution of a polymer of said selected monomeric composition previously formed in a second primary reactor to a holding vessel while retaining, in said second primary reactor, conversely 97% to 3% of said previously formed solution, the percentages being based on the total charge present in said second primary reactor just before discharge thereof, thereafter (II-A) charging said selected monomeric composition, plus an inert organic solvent, plus a lithium hydrocarbon catalyst into said second primary reactor whereby to cause a solution of a polymer of said monomeric composition to be formed, (I-B) simultaneously with step (II-A), transferring from 3% to 97% of a polymer solution previously formed in said first primary reactor to the holding vessel while retaining, in said first primary reactor, conversely 97% to 3% of said previously formed solution, the percentages being based on the total charge present in said first primary reactor just before discharge thereof, repeating the steps (I-A) and (II-B) on the one hand and (II-A) and (I-B) on the other hand in alternating sequence, whereby to provide a substantially continuous flow of polymer solution to said holding vessel, any step (I-A) being carried out with the first primary reactor still containing the polymer solution retained therein by the immediately preceding step (I–B), and any step (II–A) being carried out with the second primary reactor still containing the polymer solution retained therein by the immediately preceding step (II–B) and (III) discharging the solution of polymer from the holding vessel to a recovery system wherein the stream of the solution is mingled with steam and hot water to evaporate the solvent and leave the polymer as a slurry in the water, the resultant vapors are condensed and the solvent mechanically separated from the water and transferred to the holding vessel to dilute the polymer solution therein.

5. Process which comprises (I–A) charging isoprene, plus an inert organic solvent, plus a lithium hydrocarbon polymerization catalyst into a first primary reactor whereby to cause a solution of polyisoprene to be formed, (II–B) simultaneously with step (I–A), transferring from 3% to 97% of a polyisoprene solution previously formed in a second primary reactor to a holding vessel while retaining, in said second primary reactor, conversely from 97% to 3% of said previously formed solution, the percentages being based on the total charge present in said second primary reactor just before discharge thereof, thereafter (II–A) charging isoprene, plus an inert organic solvent, plus a lithium hydrocarbon catalyst into said second primary reactor whereby to cause a solution of polyisoprene to be formed, (I–B) simultaneously with step (II–A), transferring from 3% to 97% of the polyisoprene solution previously formed in said first primary reactor to the holding vessel while retaining, in said first primary reactor, conversely from 97% to 3% of said previously formed solution, the percentages being based on the total charge present in said first primary reactor just before discharge thereof, repeating the steps (I–A) and (II–B) on the one hand and (II–A) and (I–B) on the other hand in alternating sequence, whereby to provide a substantially continuous flow of polyisoprene solution to said holding vessel, any step (I–A) being carried out with the first primary reactor still containing the polyisoprene solution retained therein by the immediately preceding step (I–B), and any step (II–A) being carried out with the second primary reactor still containing the polyisoprene solution retained therein by the immediately preceding step (II–B) and (III) discharging the solution of polyisoprene from the holding vessel to a recovery system wherein a stream of the solution is mingled with steam and hot water to evaporate the solvent and leave the polyisoprene as a slurry in the water, the resultant vapors are condensed and the solvent mechanically separated from the water and transferred to the holding vessel to dilute the polyisoprene solution therein.

6. Process which comprises (I–A) charging isoprene, plus a saturated aliphatic hydrocarbon solvent containing from 3 to 16 carbon atoms, plus a lithium hydrocarbon catalyst into a first primary reactor whereby to cause a solution of polyisoprene to be formed, (II–B) simultaneously with step (I–A), transferring about 93.1% of a polyisoprene solution previously formed in a second primary reactor to a holding vessel while retaining, in said second primary reactor, about 6.9% of said previously formed solution, the percentages being based on the total charge present in said second primary reactor just before discharge thereof, thereafter (II–A) charging isoprene, plus a saturated aliphatic hydrocarbon solvent containing from 3 to 16 carbon atoms, plus a lithium hydrocarbon catalyst into said second primary reactor whereby to cause a solution of polyisoprene to be formed, (I–B) simultaneously with step (II–A) transferring about 93.1% of the polyisoprene solution previously formed in said first primary reactor to the holding vessel while retaining, in said first primary reactor, about 6.9% of said previously formed solution, the percentages being based on the total charge present in said first primary reactor just before discharge thereof, repeating the steps (I–A) and (II–B) on the one hand and (II–A) and (I–B) on the other hand in alternating sequence, whereby to provide a substantially continuous flow of polyisoprene solution to said holding vessel, any step (I–A) being carried out with the first primary reactor still containing the polyisoprene solution retained therein by the immediately preceding step (I–B), and any step (II–A) being carried out with the second primary reactor still containing the polyisoprene solution retained therein by the immediately preceding step (II–B) and (III) discharging the solution of polyisoprene from the holding vessel to a recovery system wherein a stream of the solution is mingled with steam and hot water to evaporate the solvent and leave the polyisoprene as a slurry in the water, the resultant vapors are condensed and the solvent mechanically separated from the water and transferred to the holding vessel to dilute the polyisoprene solution therein.

References Cited by the Examiner
UNITED STATES PATENTS

| | | | |
|---|---|---|---|
| 2,392,585 | 1/1946 | Fryling | 260—83.7 |
| 2,506,857 | 5/1950 | Crouch | 260—94.2 |
| 2,728,801 | 12/1955 | Jaros et al. | 260—94.2 |
| 2,856,391 | 10/1958 | Diem | 260—94.9 |
| 2,880,076 | 3/1959 | Kircher et al. | 23—285 |

OTHER REFERENCES

Schildknecht-Polymer Processes, Interscience Publishers, Inc., New York, New York, copyright Feb. 28, 1956, pp. 213.

JOSEPH L. SCHOFER, *Primary Examiner.*

LEON J. BERCOVITZ, *Examiner.*

C. R. REAP, *Assistant Examiner.*

UNITED STATES PATENT OFFICE
CERTIFICATE OF CORRECTION

Patent No. 3,284,430  Dated November 8, 1966

Inventor(s) Lawrence E. Forman and Charles H. Hammond

It is certified that error appears in the above-identified patent and that said Letters Patent are hereby corrected as shown below:

Column 5, line 20
"vis." should be -- viz. --

Column 7, line 27, the formula should correctly read:

$$(1) \quad M_{EP} + (M_H)_o \colon X_p A_q \quad (M_{EP})_n \left[(M_H)_o X_p A_q\right]_r$$
$$+ M_H \text{ (metallic)} + (M_{EP})_x$$
$$(III)$$

Column 7, line 38 ff. "in the course of reaction" should read -- in the course of the reaction --

Column 7, line 45 "1" should be enclosed in parentheses, thusly -- (1) --

Column 10, line 17 "The" should be -- This --

SIGNED AND
SEALED
MAR 17 1970

(SEAL)
Attest:

Edward M. Fletcher, Jr.
Attesting Officer

WILLIAM E. SCHUYLER, JR.
Commissioner of Patents